United States Patent [19]

Manero et al.

[11] 3,918,200

[45] Nov. 11, 1975

[54] METHOD FOR INCREASING DIOSGENIN YIELD FROM DIOSCOREA CULTIVATION

[75] Inventors: Carlos Manero; Miguel Escobar, both of Mexico City, Mexico; Emanuel B. Hershberg, West Orange; Hershel L. Herzog, Glen Ridge, both of N.J.

[73] Assignee: Schering Corporation, Kenilworth, N.J.

[22] Filed: Oct. 9, 1974

[21] Appl. No.: 513,443

[52] U.S. Cl. .................... 47/58; 47/44; 260/239.55
[51] Int. Cl.² .......................................... A01G 17/00
[58] Field of Search ......... 260/239.55; 47/58, 44–47

[56] References Cited

UNITED STATES PATENTS

| 68,475 | 9/1867 | Whitney | 47/45 |
| 501,991 | 7/1893 | Craig | 47/45 |
| 3,585,755 | 6/1971 | Thomas | 47/45 |

*Primary Examiner*—Robert E. Bagwill
*Attorney, Agent, or Firm*—Bruce M. Eisen; Stephen B. Coan

[57] ABSTRACT

A novel improvement in the cultivation of Dioscorea plants is provided whereby the plants are grown to heights of 4 to 6 meters before harvesting. This results in an appreciable increase in the amount of diosgenin recoverable from the roots.

4 Claims, No Drawings

METHOD FOR INCREASING DIOSGENIN YIELD FROM DIOSCOREA CULTIVATION

This invention relates to an improved method for the cultivation of Dioscorea plants wherein the percentage of recoveralbe diosgenin in the plant roots is significantly increased.

Diosgenin is the most important precursor for the production of steroidal drugs. For example, such valuable corticosteroids as cortisone, prednisone and betamethasone are prepared by known methods utilizing diosgenin as the starting material. Some of this diosgenin is produced by cultivation of Dioscorea plant species such as *Dioscorea composita* and *Dioscorea floribunda*, while the remainder is obtained from plants growing naturally in the tropical forests. The diosgenin is present in the rhizomes or tubers in the form of its glycoside, dioscin, which yields diosgenin upon hydrolysis with acid or by fermentative cleavage by organisms of the Aspergillus species. Other sapogenins are generally also co-produced in the rhizomes.

Techniques for cultivating Dioscorea plants are well known. These plants are perennial vines which require external support means. They are propagated asexually, from pieces of tuber or from seeds and harvested months or years after field growth.

Unfortunately, suitable Dioscorea plants can be economically cultivated only in tropical areas, free from frost and with adequate rainfall. Particularly in view of this limitation considerable experimentation has been undertaken investigating a number of variables in an attempt to maximize the yield of diosgenin. A summary of some pertinent experimental findings appears in the Cruzado, et al., article, "Effects of Various Vine Supports and Spacing Distances on Steroid Production of *Dioscorea composita*," Tropical Agriculture, Volume 41, Pages 345–349, October 1964. Based on such studies it has been common practice to grow the Dioscorea plants to about 2 meters on various artificial (non-living) supports. This simulates the natural growth in the forest where the vines compete with lush undergrowth seeking light by growing over bushes and trees.

Generally, a non-living support system comprises poles connected by wires from which hand vertical strings. During their controlled growth the vines climb in a spiral around the strings and become supported by the wires. Using such methods of cultivation the diosgenin yield in the roots of these plants are in the order of 2–4%. Methods for extracting diosgenin from the Dioscorea roots are well-known in the art as exemplified by U.S. Pat. No. 3,505,316 and references cited therein.

We have now discovered that the diosgenin content of these Dioscorea plants can be considerably and unexpectedly increased by causing these vines to grow to a level of between 4 and 6 meters.

In order to obtain an economically practical yield of diosgenin by cultivation of Dioscorea it is necessary to crowd as many plants as possible into each hectare of farmland. By so doing the plants become prey to insects and particularly to viruses of as yet unknown species. The diseased plants are easily recognized by their stunted growth and small rhizomes. In their natural habitat in the forest the sparse population of plants evidently lessens these problems.

Our method makes possible a concentration of 30,000 to 50,000 plants per hectare with minimal loss due to virus. It increases the total yield, the yield per hectare per year, and the survival rate of plants in the cultivated area.

The same system of poles, wire and vertical strings hereto used in the prior art can be employed, except of course that the poles are correspondingly higher. Telephone poles represent convenient and readily accessible articles of commerce for use as supporting poles.

In a preferred embodiment of the invention the plants are permitted to grow vertically on strings to a level of 1.5–2 meters at which level a system of horizontal wires is strung between the poles at the end of each row of plants. During this first season frequent weeding and cultivation is necessary to lessen the otherwise competitive demand on fertilizers and nutrients.

When the plants reach the point of attachment of the strings to the cross-wires they are allowed to bridge the gap between rows by guidance on strings. Thus, after 12–15 months a dense canopy of leaves and vines forms which effectively screens the ground from direct sunlight. Thereafter, weed growth is no longer an important variable. Vine and leaf growth continue, however, but competition between plants for the available sunlight limits their growth, particularly the rhizomes in which the diosgenin collects. While each succeeding season may add to the diosgenin content of the root and to the increase in weight of the total root structure, the incremental amounts of both are now limited to the energy which the plants can absorb corresponding to the cultivated area.

At this point of growth of the cultivated area a second set of cross-wires is attached at the new, higher level of 4 to 6 meters along each row.

A second set of strings is dropped from the 4 – 6-meter level to the 1.5 – 2-meter canopy. The plants readily attach themselves to the strings and the process of vertical growth is permitted to follow. In this way a new set of leaf walls is formed which is exposed to the light energy from the sun. Quite unexpectedly, the diosgenin content of these roots increases significantly in terms of yield of grams of diosgenin per plant. The plants are healthier and no further virus attack is observed. Furthermore, as mentioned before we have found that the survival rate for plants cultivated at this novel height is higher than plants grown at the normal level. This additionally increases the total yield of diosgenin per hectare. In employing the method of our invention one preferably allows the plants to grow from 36 to 44 months before harvesting.

The following data summarize the results of an experimental cultivation of an equal number of *Dioscorea composita* plants comparing the improved method of our invention with that of the prior art. Similar poles, wires and strings constituted the support system as described above.

|  | FRESH ROOT WEIGHT Kg. | DIOSGENIN CONTENT % m.f.b. | DIOSGENIN PER PLANT Gm. | SURVIVAL RATE % | DIOSGENIN PER HA. Kg. |
|---|---|---|---|---|---|
| STANDARD LEVEL | 4.917 | 3.55 | 26.58 | 61.5 | 490 |

-continued

|  | FRESH ROOT WEIGHT Kg. | DIOSGENIN CONTENT % m.f.b. | DIOSGENIN PER PLANT Gm. | SURVIVAL RATE % | DIOSGENIN PER HA. Kg. |
|---|---|---|---|---|---|
| HIGH LEVEL | 4.276 | 4.96 | 33.09 | 85.3 | 847 |

In the above experiment the standard support level was 2 meters whereas the novel high support level was 5 meters, a preferred embodiment. In both cases spacing distances were the same and harvesting occurred after 40 months of total field growth. Diosgenin content was determined on a moisture free basis (m.f.b.). The increase in surface exposed to light at the novel level was 32%. The absolute increase in diosgenin per plant was 24%. The plant survival rate was significantly higher. In the important parameter of diosgenin yield per hectare, the novel high level support system afforded an increase of 73%.

Numerous variants of the above method within the spirit of our invention will be apparent to one skilled in the art.

We claim:

1. In the process of cultivating Dioscorea plants in order to produce extractable diosgenin in their roots, the improvement for increasing the yield of diosgenin which comprises cultivating said plants on an artificial support system to a height within the range of 4 to 6 meters, wherein said plants are cultivated to effect a first period of vertical growth, followed by cultivating them to effect a subsequent period of horizontal growth, and then cultivating them to effect a final period of vertical growth before harvesting.

2. A method according to claim 1 wherein said harvesting is performed after about 36 to 44 months of field growth.

3. A method according to claim 1 wherein said height is about 5 meters.

4. A method according to claim 1 wherein the plants are cultivated during said first period of vertical growth to a height of about 1.5–2 meters.

* * * * *